(12) United States Patent
Watanabe et al.

(10) Patent No.: US 8,159,530 B2
(45) Date of Patent: Apr. 17, 2012

(54) METHOD AND APPARATUS FOR DISPLAYING STEREOSCOPIC IMAGES

(75) Inventors: Mikio Watanabe, Miyagi (JP); Tomonori Masuda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 472 days.

(21) Appl. No.: 12/411,073

(22) Filed: Mar. 25, 2009

(65) Prior Publication Data
US 2009/0244269 A1 Oct. 1, 2009

(30) Foreign Application Priority Data

Mar. 26, 2008 (JP) .................... 2008-079634

(51) Int. Cl.
*H04N 13/04* (2006.01)
(52) U.S. Cl. ............. 348/51; 348/42; 348/47; 348/54; 348/55; 348/58; 348/59
(58) Field of Classification Search ........... 348/42, 348/47, 51, 54, 55, 58, 59
See application file for complete search history.

(56) References Cited

U.S. PATENT DOCUMENTS

| | | | |
|---|---|---|---|
| 6,747,610 B1 * | 6/2004 | Taima et al. | 345/6 |
| 7,508,972 B2 * | 3/2009 | Maruya | 382/144 |
| 7,580,463 B2 * | 8/2009 | Routhier et al. | 375/240.25 |
| 7,830,601 B2 * | 11/2010 | Takagi et al. | 359/463 |
| 2005/0117637 A1 * | 6/2005 | Routhier et al. | 375/240.01 |
| 2006/0044388 A1 * | 3/2006 | Kim et al. | 348/42 |
| 2006/0290778 A1 | 12/2006 | Kitaura et al. | |
| 2009/0185083 A1 | 7/2009 | Ohtoshi et al. | |

FOREIGN PATENT DOCUMENTS

| | | |
|---|---|---|
| JP | 2004-7396 A | 1/2004 |
| JP | 2004-207772 A | 7/2004 |
| JP | 2005-73049 A | 3/2005 |
| WO | WO 2007/069557 A1 | 6/2007 |
| WO | WO 2007/097353 A1 | 8/2007 |

\* cited by examiner

*Primary Examiner* — Liangche A Wang
(74) *Attorney, Agent, or Firm* — Birch, Stewart, Kolasch & Birch, LLP

(57) ABSTRACT

A stereoscopic image display apparatus displays stereoscopic images generated from a plurality of images obtained by photography of subjects from different viewpoints. The stereoscopic image display apparatus is constituted by: an interpolative image generating section, for generating at least one pair of interpolative images, which have smaller degrees of parallax than the degree of parallax among the plurality of images; a stereoscopic image generating section, for generating at least one interpolative stereoscopic image from the at least one pair of interpolative images; and a display control section, for sequentially displaying the at least one interpolative stereoscopic image at at least one of a timing prior to and following display of the stereoscopic images.

8 Claims, 8 Drawing Sheets

METHOD AND APPARATUS FOR DISPLAYING STEREOSCOPIC IMAGES

BACKGROUND OF THE INVENTION

1. Field of the Invention

The present invention is related to a stereoscopic image display method and a stereoscopic image display apparatus for displaying stereoscopic images. The present invention is also related to a program that causes a computer to execute the stereoscopic image display method.

2. Description of the Related Art

It is known that stereoscopic viewing that utilizes parallax is enabled by combining and displaying a plurality of images. Stereoscopic images that enable stereoscopic viewing may be generated by obtaining a plurality of images of a single subject using a plurality of cameras at different positions, then combining a plurality of images utilizing the parallax of the subject included in the plurality of images.

Specifically, stereoscopic images may be generated by causing colors in the plurality of images to be different, such as red and blue, then overlapping the images. Alternatively, stereoscopic images may be generated by causing the polarization directions to be different within the plurality of images, then overlapping the images. In these cases, stereoscopic images can be viewed three dimensionally, by viewers' eyes stereoscopically viewing the stereoscopic images, which are displayed using red/blue glasses or polarizing glasses, using the automatic focusing function of the eyes (the anaglyph method and the polarizing filter method).

It is also possible to view stereoscopic images three dimensionally without using polarizing glasses and the like. The parallax barrier method and the lenticular method enable stereoscopic images to be viewed three dimensionally, by displaying the stereoscopic images on a three dimensional liquid crystal display. In these cases, the stereoscopic images are generated by cutting the plurality of images into vertically extending stripes, which are then arranged alternately. Another example of a stereoscopic display method is the time division method, in which the light beam directions of left and right images are changed by the use of image separating glasses or by attaching optical elements to liquid crystal displays, and displaying the right and left images alternately.

A technique has been proposed, in which the parallax of stereoscopic images are adjusted based on user input of amounts of parallax, to change the perceived depth when displaying such stereoscopic images (refer to Japanese Unexamined Patent Publication No. 2004-207772).

When performing photography to obtain a plurality of stereoscopic images, the angle of view, the zoom magnification, the focal point, and the positional relationship between cameras are different for each photography scene. Therefore, the perceived depth is different in each of the plurality of stereoscopic images. However, stereoscopic viewing is performed by users realizing perceived depths in their minds through visual perception. Therefore, in cases that a plurality of stereoscopic images are sequentially displayed, the perceived depths of the images will change suddenly when the display switches from one stereoscopic image to another. In three dimensional viewing, depth perception is realized by the automatic focusing function of the eyes of viewers who are viewing stereoscopic images. Therefore, viewers will become extremely fatigued if the perceived depths of images switch suddenly.

Applying the technique disclosed in Japanese Unexamined Patent Publication No. 2004-207772 to change the perceived depths of stereoscopic images may be considered. However, this technique adjusts the amounts of parallax by user input. Therefore, the operations for changing the perceived depths of stereoscopic images become burdensome, particularly in the case that a plurality of stereoscopic images are to be displayed. As a result, application of this technique is inefficient.

SUMMARY OF THE INVENTION

The present invention has been developed in view of the foregoing circumstances. It is an object of the present invention to enable the perceived depths of stereoscopic images to be changed efficiently, thereby reducing fatigue in users who stereoscopically view stereoscopic images.

A stereoscopic image display apparatus of the present invention is a stereoscopic image display apparatus for displaying stereoscopic images generated from a plurality of images obtained by photography of subjects from different viewpoints, characterized by comprising:

interpolative image generating means, for generating at least one pair of interpolative images, which have smaller degrees of parallax than the degree of parallax among the plurality of images;

stereoscopic image generating means, for generating at least one interpolative stereoscopic image from the at least one pair of interpolative images; and display control means, for sequentially displaying the at least one interpolative stereoscopic image at at least one of a timing prior to and following display of the stereoscopic images.

The stereoscopic image display apparatus of the present invention displays stereoscopic images such that the perceived depths thereof progressively change prior to and/or following the display of each stereoscopic image. The perceived depth of the stereoscopic images can be adjusted without burdening users, and fatigue in users who stereoscopically view the stereoscopic images can be reduced.

The "pair of interpolative images" include interpolative images which are generated corresponding to each of the plurality of images obtained by photography. Corresponding pairs of interpolative images have smaller amounts of parallax than corresponding pairs of the plurality of images obtained by photography. In the case that a plurality of pairs of interpolative images are generated, the interpolative images of the pairs are generated such that the amounts of parallax therebetween progressively become smaller than the amount of parallax of a corresponding pair of images obtained by photography.

In the stereoscopic image display apparatus of the present invention, a configuration may be adopted, wherein:

the display control means sequentially displays the at least one interpolative stereoscopic image such that the perceived depth increases progressively up to the perceived depth of a stereoscopic image, when a command to display the stereoscopic image is received.

In the stereoscopic image display apparatus of the present invention, a configuration may be adopted, wherein:

in the case that a plurality of stereoscopic images are displayed, the display control means sequentially displays the at least one interpolative stereoscopic image such that the perceived depth decreases progressively from the perceived depth of a preceding stereoscopic image, when a command to display a next stereoscopic image is received.

In the stereoscopic image display apparatus of the present invention, a configuration may be adopted, wherein:

in the case that a plurality of stereoscopic images are displayed, the interpolative image generating means generates a greater number of pairs of interpolative images as the correlation between sequential stereoscopic images is smaller.

In this case, drastic changes in perceived depth when stereoscopic images having different designs or subjects are displayed sequentially can be prevented. As a result, fatigue in users who stereoscopically view the stereoscopic images can be reduced further.

In the stereoscopic image display apparatus of the present invention, a configuration may be adopted, wherein:

in the case that a plurality of stereoscopic images are displayed, the interpolative image generating means ceases generation of the interpolative images if the correlation between sequential stereoscopic images is greater than or equal to a predetermined threshold value; and the display control means ceases display of the interpolative stereoscopic images at at least one of a timing prior to and following display of the stereoscopic images, for which generation of the interpolative images has been ceased.

In this case, unnatural changes of perceived depth can be prevented, when stereoscopic images having similar designs or subjects are sequentially displayed.

In the stereoscopic image display apparatus of the present invention, a configuration may be adopted, wherein:

in the case that a plurality of stereoscopic images are displayed, the interpolative image generating means generates a plurality of pairs of the interpolative images;

the stereoscopic image generating means generates a plurality of the interpolative stereoscopic images; and the display control means sequentially displays the plurality of interpolative stereoscopic images such that the display time progressively becomes shorter, when a command to switch to display of a next stereoscopic image is received.

In this case, the interpolative stereoscopic image is displayed for a long time immediately following a switch to display of a next stereoscopic image, and the display time of each following interpolative stereoscopic image gradually becomes shorter. Accordingly, drastic changes in perceived depth can be prevented, and as a result, fatigue in users who stereoscopically view the stereoscopic images can be reduced further.

In the stereoscopic image display apparatus of the present invention, a configuration may be adopted, wherein:

the display control means sets the display time of each of the interpolative stereoscopic images to be longer as the correlation between sequential stereoscopic images is smaller.

In this case, drastic changes in perceived depth when stereoscopic images having different designs or subjects are displayed sequentially can be prevented. As a result, fatigue in users who stereoscopically view the stereoscopic images can be reduced further.

In the stereoscopic image display apparatus of the present invention, a configuration may be adopted, wherein:

the display control means sequentially displays the interpolative stereoscopic images such that the perceived depth decreases progressively from the perceived depth of a stereoscopic image, when a command to cease display of the stereoscopic image is received.

In this case, fatigue caused in users due to sudden cessation of stereoscopic viewing can be prevented.

A stereoscopic image display method of the present invention is a stereoscopic image display method for displaying stereoscopic images generated from a plurality of images obtained by photography of subjects from different viewpoints, characterized by comprising the steps of:

generating at least one pair of interpolative images, which have smaller degrees of parallax than the degree of parallax among the plurality of images;

generating at least one interpolative stereoscopic image from the at least one pair of interpolative images; and sequentially displaying the at least one interpolative stereoscopic image at at least one of a timing prior to and following display of the stereoscopic images.

The stereoscopic image display method according to the present invention may be provided as a program that causes a computer to execute the method.

Note that the program according to the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

BEST MODE FOR CARRYING OUT THE INVENTION

Figure 1:
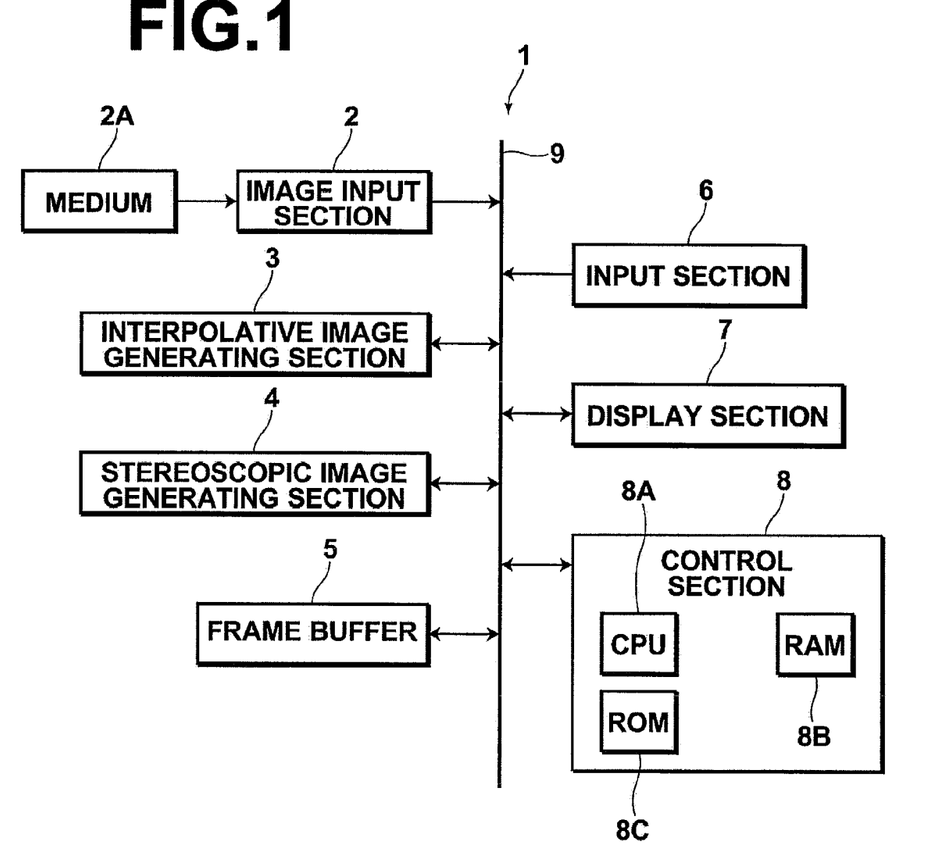
FIG. 1 is a block diagram that illustrates the schematic construction of a stereoscopic image display apparatus according to a first embodiment of the present invention.

Hereinafter, embodiments of the present invention will be described with reference to the attached drawings. FIG. 1 is a block diagram that illustrates the schematic construction of a stereoscopic image display apparatus 1 according to a first embodiment of the present invention. As illustrated in FIG. 1, the stereoscopic image processing apparatus 1 is equipped with: an image input section 2; an interpolative image generating section 3; a stereoscopic image generating section 4; a frame buffer 5; an input section 6 constituted by a keyboard, a mouse, and the like, for performing various input operations; a display section 7 such as a liquid crystal display monitor, for performing various types of display; and a control section 8. The components listed above are connected by a bus 9.

The image input section 2 inputs image files, in which pairs of images for generating stereoscopic images are recorded, to the stereoscopic image display apparatus 1. Known means, such as media drives that read out image files from media, wired or wireless interfaces that receive input of image files via networks, and the like may be employed as the image input section 2. In the present embodiment, the image input section 2 is configured to read out image files from a medium 2A. Note that the image files are compressed into formats such as JPEG. Therefore, the image input section 2 decompresses the input image files, and provides the decompressed image files to the stereoscopic image display apparatus 1 for further processing.

Figure 2:
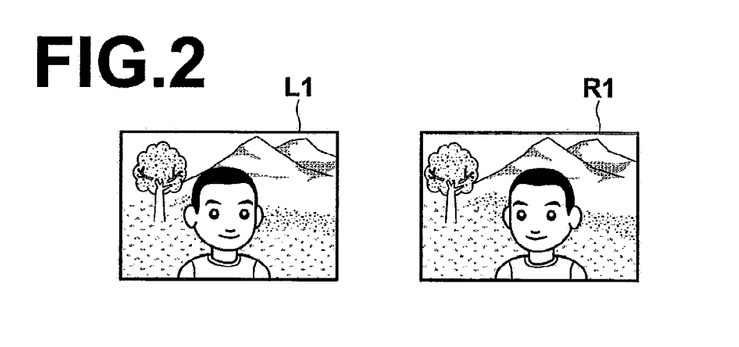
FIG. 2 illustrates an example of a pair of images which are included in an image file.

Here, a "pair of images" are obtained by performing photography of a subject from two different photography positions. As illustrated in FIG. 2, a subject pictured in two images L1 and R1 have parallax therebetween corresponding to the difference in photography positions. Note that the pair of images is obtained by photography from two photography positions, that is, a leftward photography position and a rightward photography position. Therefore, images which are displayed toward the right during generation of stereoscopic images will be referred to as "rightward images", and images which are displayed toward the left during generation of stereoscopic images will be referred to as "leftward images". In the first embodiment, stereoscopic images are generated from pairs of images. Alternatively, stereoscopic images may be generated from sets of three or more images, which are obtained by photography from three or more photography positions.

Figure 3:
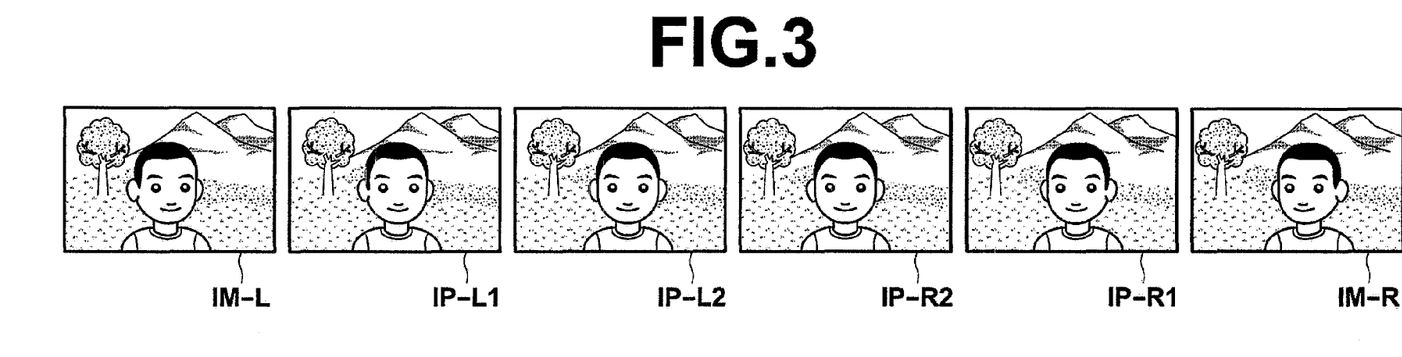
FIG. 3 is a diagram for explaining the generation of interpolative images.

The interpolative image generating section 3 generates at least one pair of interpolative images for each pair of rightward images and leftward images included in the image files. That is, the interpolative image generating section 3 generates at least one pair of interpolative images constituted by an interpolative rightward image and an interpolative leftward image. FIG. 3 is a diagram for explaining generation of the interpolative images. As illustrated in FIG. 3, the interpolative image generating section 3 generates m (here, m=2) interpolative rightward images IP-Rm (m=1 to k, k is the number of interpolations) from a rightward image IM-R included in an image file, and two interpolative leftward images IP-Lm from a leftward image IM-L included in the image file. Accordingly, m pairs of interpolative images are generated. Note that the parallax between pairs of the interpolative rightward images and the interpolative leftward decreases, as the number attached to the file names thereof become greater. The number of interpolations k will be described later.

Note that the interpolative image generating section 3 processes the rightward image IM-R and the leftward image IM-L by a morphing process or the like, such that the parallax among corresponding pixels included therein gradually becomes smaller, to generate the interpolative rightward images IP-Rm and the interpolative leftward images IP-Lm. Specifically, corresponding points that correspond to each other are detected from within the leftward and rightward images, and connected by lines or curved lines. The lines or curved lines are divided to calculate pseudo corresponding points, and the leftward and rightward images are deformed to correspond to the pseudo corresponding points, to generate the interpolative rightward images IP-Rm and the interpolative leftward images IP-LM.

The stereoscopic image generating section 4 administers stereoscopic conversion onto the rightward image IM-R and the leftward image IM-L, as well as the interpolative rightward images IP-Rm and the interpolative leftward images IP-Lm such that they are stereoscopically viewable at the display section 7, to generate a stereoscopic image D0 and two interpolative stereoscopic images Hm. Note that the stereoscopic conversion process depends on the manner of stereoscopic vision to be employed and whether the display section 7 is a three dimensional liquid crystal display. Examples of methods by which the stereoscopic images may be displayed include: the anaglyph method, in which the colors of the pairs of images (the original images and interpolative images having the same value of m) are changed to red and blue then the images are overlapped; the polarization filter method, in which the polarization directions of the pairs of images are changed then the images are overlapped; and the parallax barrier method and the lenticular method, in which the stereoscopic images are generated by cutting the plurality of images into lines, which are then arranged alternately.

The frame buffer 5 reads out and temporarily stores the stereoscopic images and the interpolative images when the stereoscopic images are displayed sequentially, as will be described later.

The control section 8 is equipped with: a CPU 8A; a RAM 8B, which functions as a workspace during execution of processes; and a ROM 8C, in which programs for operating the stereoscopic video processing apparatus 1, various constants, various tables to be described later, and the like are recorded. The control section 8 functions to control the operations of the components of the stereoscopic image display apparatus 1, particularly the processes of displaying a plurality of stereoscopic images as a slide show, determining the number of interpolative images to be generated by the interpolative image generating section 3, and determining the durations of display of the interpolative stereoscopic images by the display section 7.

Figure 4:
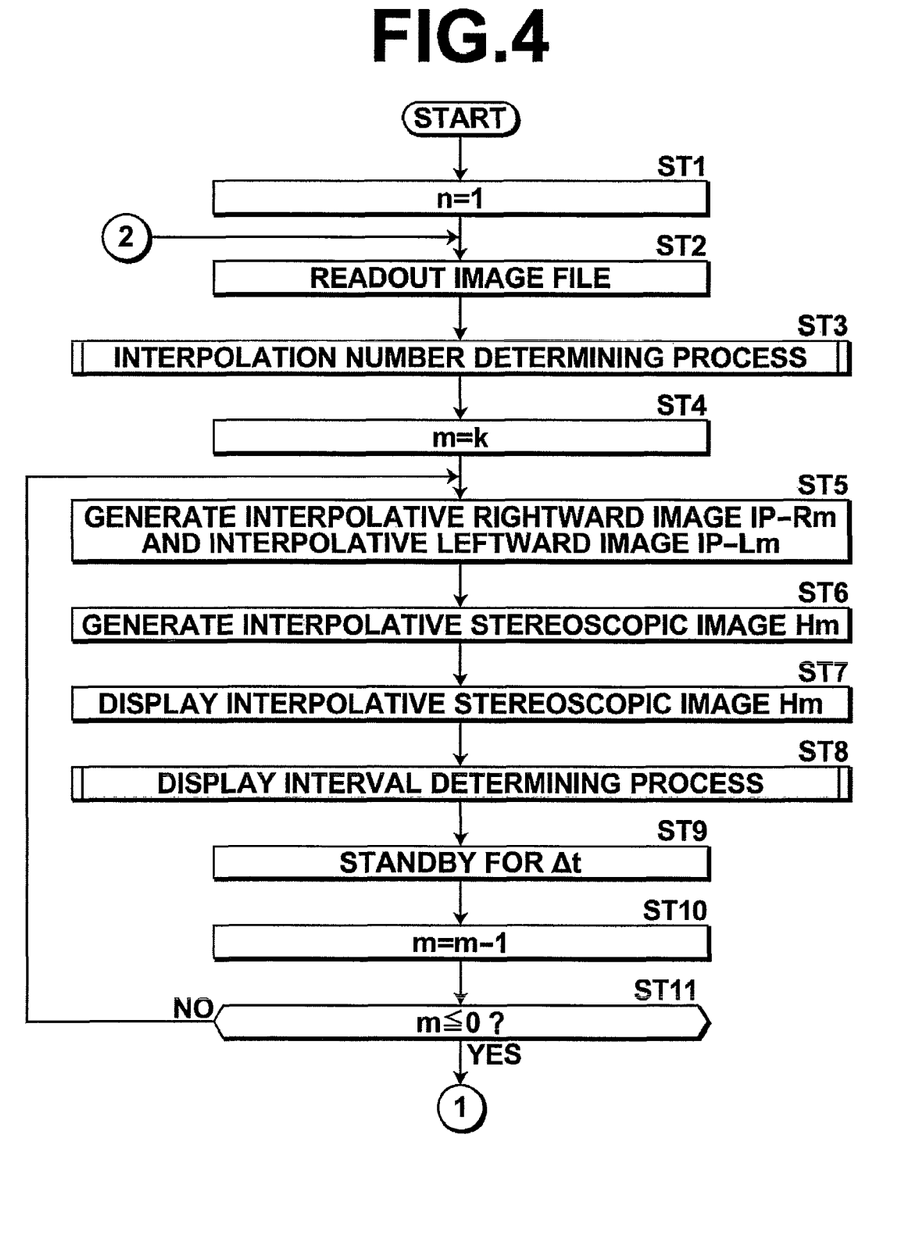
FIG. 4 is a first flow chart that illustrates the steps of a process performed by the stereoscopic image display apparatus of the first embodiment.
Figure 5:
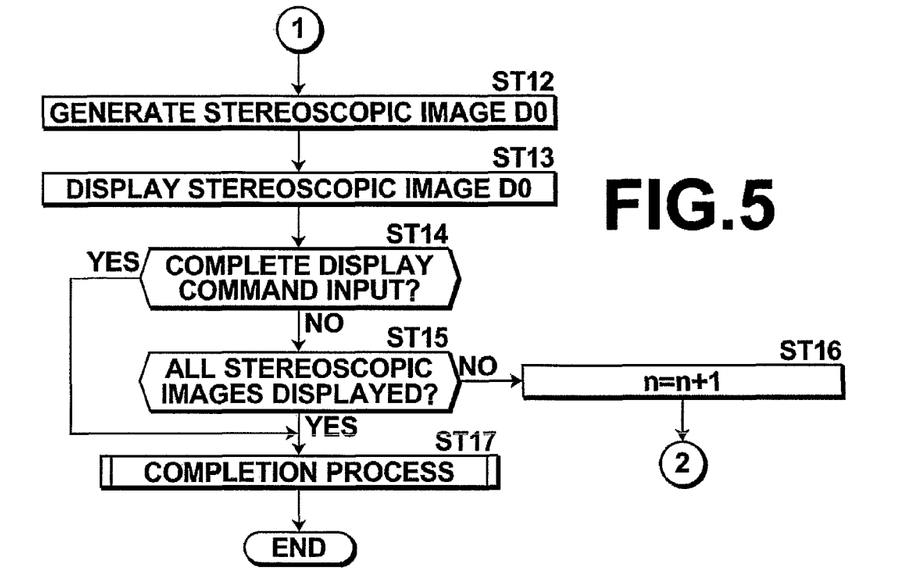
FIG. 5 is a second flow chart that illustrates the steps of a process performed by the stereoscopic image display apparatus of the first embodiment.

Next, the process performed by the stereoscopic image display apparatus of the first embodiment will be described. FIG. 4 and FIG. 5 are flow charts that illustrate the steps of the process performed by the stereoscopic image display apparatus of the first embodiment. Note that in the case that a plurality of stereoscopic images are displayed, frames of stereoscopic images may be switched based on user input via the input section 6. Alternatively, the frames of stereoscopic images may be switched and sequentially displayed as a slide show, by the control section 8 issuing switching commands. The first and subsequent embodiments will be described as cases in which the frames of the stereoscopic images are switched and sequentially displayed as slide shows. The order that the stereoscopic images are displayed in is in order of file names. However, the present invention is not limited to this configuration.

The control section 8 initiates the process by a command to display stereoscopic images being input via the input section 6. First, a frame that represents a first stereoscopic image is designated as the stereoscopic image to be displayed (step ST1, n=1). The image input section 2 reads out the image file for the frame to be displayed from the medium 2A (step ST2, READ OUT IMAGE FILE). Next, the control section 8 performs a process to determine the number k of interpolative stereoscopic images (number of interpolations k) to be generated (step ST3).

Figure 6:
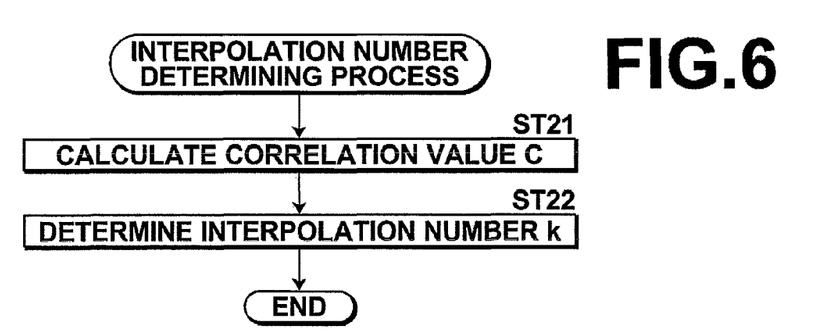
FIG. 6 is a flow chart that illustrates the steps of an interpolation number determining process.

FIG. 6 is a flow chart that illustrates the steps of an interpolation number determining process. First, the control section 8 calculates a correlation value C between the frame n to be displayed and an immediately preceding frame n−1 (step ST21). Note that the sum of the absolute values of differences, the sum of squared differences and the like among all of the pixels or of pixels within specified regions that include a main subject of the frames n and n−1 may be employed as the correlation value C. Alternatively, histograms of the frame n and the frame n−1 may be calculated, and the area which is common to the histograms of the frame n and the frame n−1 may be employed as the correlation value C. Here, the image files which are read out from the medium 2A include both rightward images and leftward images. Accordingly, the correlation value C is calculated for at least one of the rightward images and the leftward images which are included in the image files corresponding to the frame n and the frame n−1.

Note that in the case that the frame to be displayed is a first frame, there is no immediately preceding frame n−1. Therefore, in the case that the frame to be displayed is a first frame, a correlation value C is calculated between a gray image having a predetermined brightness and the frame n.

Next, the control section 8 refers to an interpolation number determining table to determine the interpolation number k from the correlation value C (step ST22), and the process ends.

Figure 7:
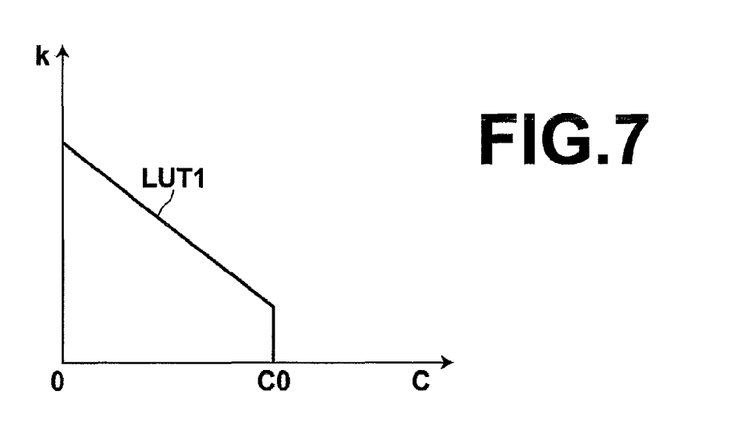
FIG. 7 is a diagram that illustrates an interpolation number determining table.

FIG. 7 is a diagram that illustrates the interpolation number determining table. As illustrated in FIG. 7, the interpolation number determining table LUT1 is a graph in which the horizontal axis represents correlation values C and the vertical axis represents interpolation numbers k. The number of interpolative stereoscopic images to be displayed decreases as the correlation value C becomes greater, that is, as the frame n to be displayed is more similar to the immediately preceding frame n−1, and the number of interpolative stereoscopic images to be displayed increases as the frame n and the immediately preceding frame n−1 is dissimilar. Note that when the correlation value C is greater than or equal to a threshold value C0, the interpolation number k becomes 0, and no interpolative images are generated. In this case, interpolative stereoscopic images are not displayed, and a stereoscopic image of a frame n is displayed following display of an immediately preceding frame n−1.

Referring again to FIG. 4, following step ST3, the control section 8 sets a variable m to the interpolation number k (step ST4). The interpolative image generating section 3 generates interpolative rightward images IP-Rm and interpolative leftward images IP-Lm from the rightward image and the leftward image of the frame n (step ST5). The stereoscopic image generating section 4 generates interpolative stereoscopic images Hm from the interpolative rightward images IP-Rm and the interpolative leftward images IP-Lm (step ST6). The control section 8 causes the interpolative stereoscopic images Hm to be displayed by the display section 7 (step ST7). Thereafter, the control section 8 performs a process to determine display intervals Δt, during which the interpolative stereoscopic images Hm are displayed by the display section 7 (step ST8).

Figure 8:
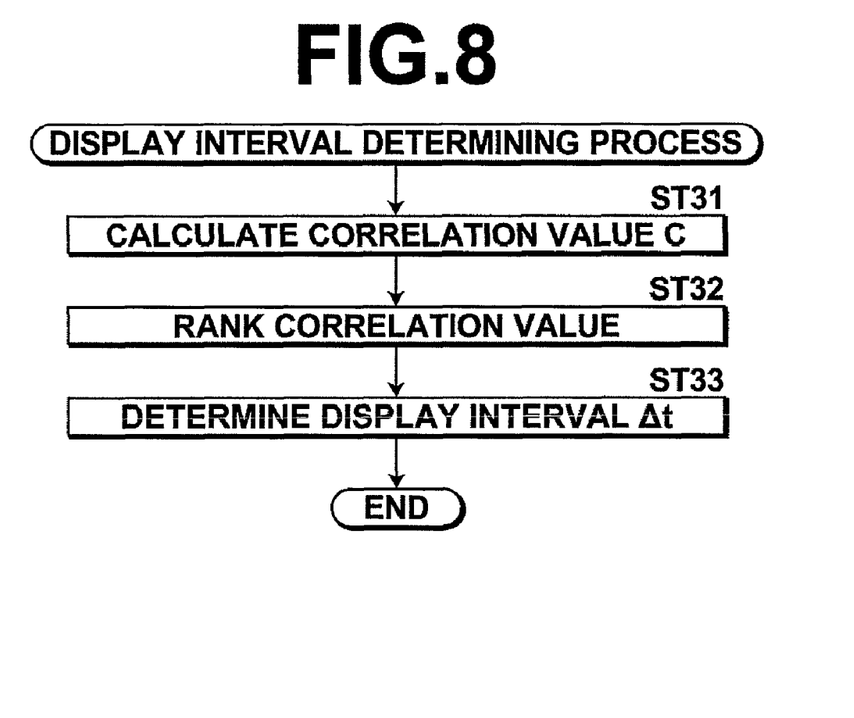
FIG. 8 is a flow chart that illustrates the steps of a display interval determining process.

FIG. 8 is a flow chart that illustrates the steps of a display interval determining process. First, the control section 8 calculates a correlation value C between the frame n to be displayed and an immediately preceding frame n−1 (step ST31). Note that the method for calculating the correlation value is the same as that used to determine the interpolation number k. Therefore, the correlation value C which was calculated when determining the interpolation number k may be employed. Next, the control section 8 ranks the correlation value C into three ordinal rankings (Large, Medium, and Small) according to the magnitude thereof (step ST32). Then, the control section 8 refers to a display interval determining table to determine a display interval Δt corresponding to the rank of the correlation value C (step ST33), and the process ends.

Figure 9:
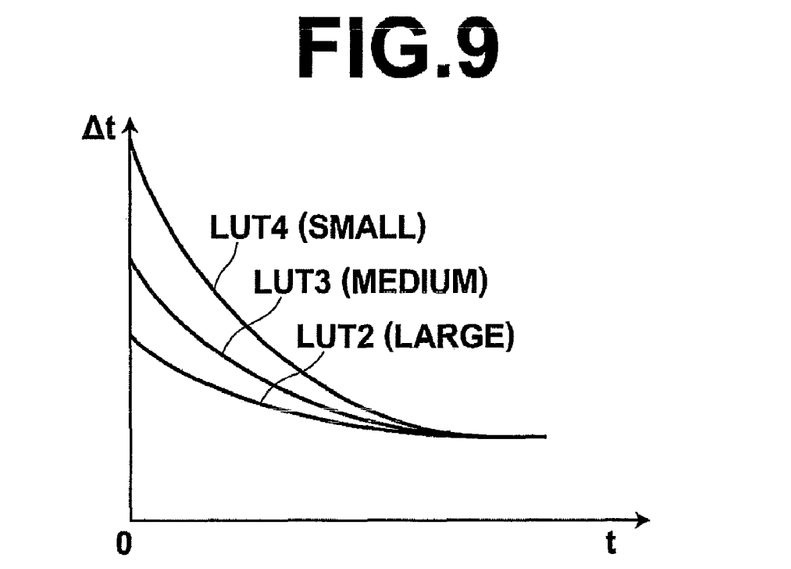
FIG. 9 is a diagram that illustrates a display interval determining table.

FIG. 9 is a diagram that illustrates the display interval determining table. Note that in the first embodiment, three display interval tables LUT2, LUT3, and LUT4 are prepared, corresponding to the three ranks of the correlation value C. As illustrated in FIG. 9, the display interval determining tables LUT2, LUT3, and LUT4 are indicated in a graph in which the horizontal axis represents amounts of elapsed time t following switching of display, and the vertical axis represents the display intervals Δt. The display-intervals Δt are longer as the amount of elapsed time t following switching of display is shorter. That is, the display intervals Δt are longer immediately following switching of display, and become shorter as the elapsed time t following switching of display becomes longer. The display interval determining tables LUT2, LUT3, and LUT4 correspond to the Large, Medium, and Small ranks of the correlation value C respectively, and are set such that the display intervals Δt are longer as the correlation value C is smaller.

Thereby, the display intervals Δt are determined to be longer immediately following switching of display, and determined to be shorter as the elapsed time t following switching of display becomes longer. Therefore, the display times for the interpolative stereoscopic images gradually become shorter as the elapsed time after switching of display becomes longer. Because the display intervals Δt are shorter as a frame n to be displayed and an immediately preceding frame n−1 are more similar, the interpolative stereoscopic images are sequentially displayed more rapidly in these cases. Because the display intervals Δt are longer as a frame n to be displayed and an immediately preceding frame n−1 are more dissimilar, the interpolative stereoscopic images are sequentially displayed more slowly in these cases.

Referring again to FIG. 4, following step ST8, the control section 8 stands by for a time period calculated as the display interval Δt (step ST9). At this time, the interpolative stereoscopic image Hm continues to be displayed by the display section 7. Next, the control section changes the value of m to m−1 (step ST10), and judges whether m has become 0 or less (step ST11). In the case that the result of judgment at step ST11 is negative, the process returns to step ST5, and the steps following thereafter are repeated. Thereby, the interpolative stereoscopic images Hm are displayed by the display section 7 such that the parallax progressively becomes greater.

On the other hand, in the case that the result of judgment at step ST11 is affirmative, the stereoscopic image generating section 4 generates a stereoscopic image D0 from the rightward image IM-R and the leftward image IM-L (step ST12). The control section 8 causes the stereoscopic image D0 to be displayed by the display section 7 (step ST13). Note that the display interval Δt at this time is a value which is set in advance.

Next, the controls section 8 judges whether a display completion command has been input via the input section 6 (step ST14). If the result of judgment in step ST14 is negative, the control section 8 judges whether stereoscopic images have been displayed for all image files recorded in the medium 2A (step ST15). If the result of judgment in step ST15 is negative, the control section 8 changes the frame to be displayed to a next frame (step ST16, n=n+1), the process returns to step ST2, and the steps following step ST2 are repeated. In the case that the result of judgment in step ST14 or step ST15 is affirmative, a completion process is performed (step ST17), and the stereoscopic image display process ends.

Figure 10:
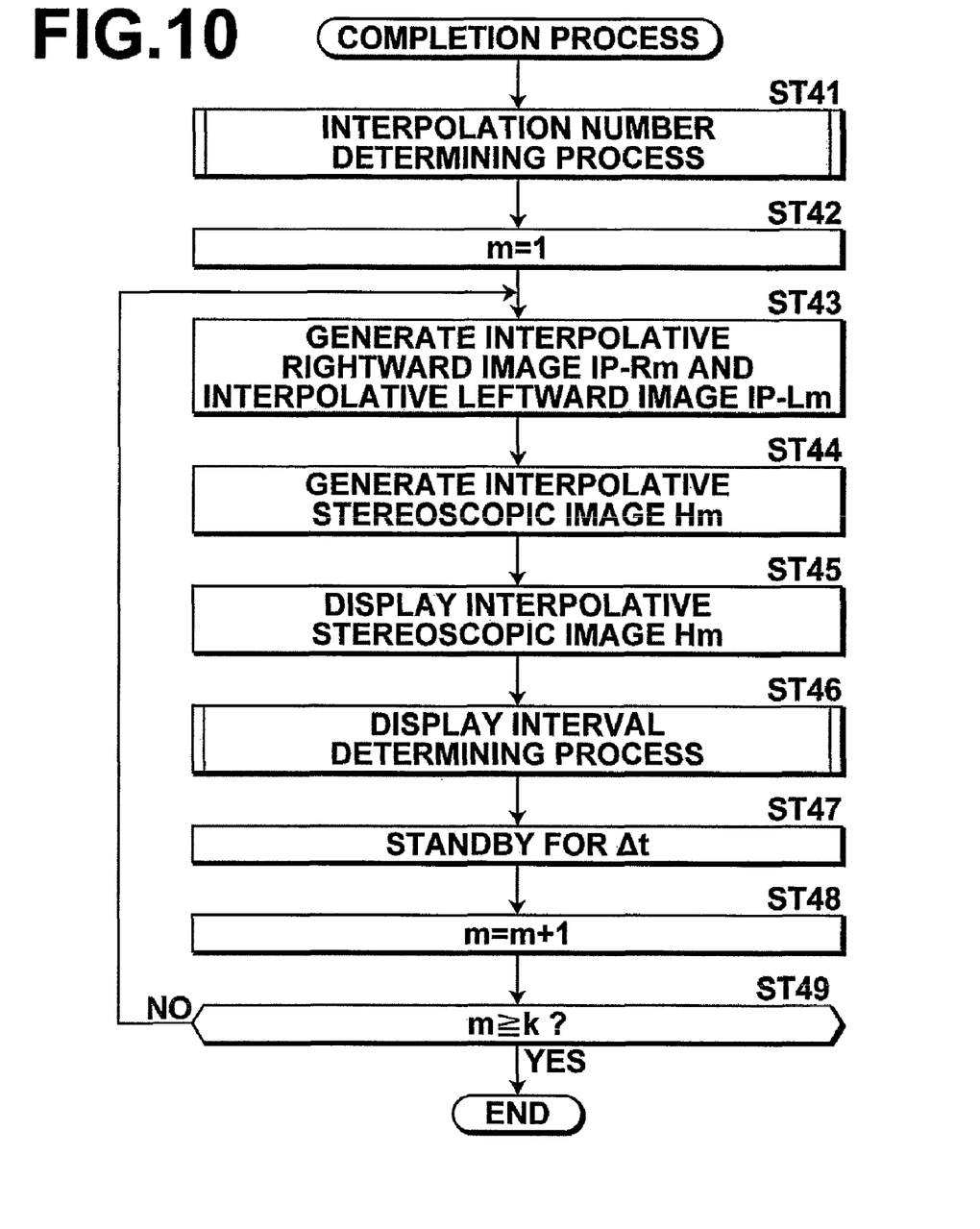
FIG. 10 is a flow chart that illustrates the steps of a completion process.

FIG. 10 is a flow chart that illustrates the steps of the completion process. First, the control section 8 performs an interpolation number determining process (step ST41). Note that the interpolation number determining process is the same as that which was described with reference to FIG. 6. However, the correlation value C is calculated between a frame n, which is being presently displayed, and a gray image having a predetermined brightness. Next, the control section 8 sets a variable m to 1 (step ST42). Thereafter, the interpolative image generating section 3 generates interpolative rightward images IP-Rm and interpolative leftward images IP-Lm from the rightward image and the leftward image of the frame n (step ST43). The stereoscopic image generating section 4 generates interpolative stereoscopic images Hm from the interpolative rightward images IP-Rm and the interpolative leftward images IP-Lm (step ST44). The control section 8 causes the interpolative stereoscopic images Hm to be displayed by the display section 7 (step ST45). Thereafter, the control section 8 performs a process to determine display intervals Δt, during which the interpolative stereoscopic images Hm are displayed by the display section 7 (step ST46). Note that the process to determine display intervals Δt is the same as that which was described with reference to FIG. 8. However, the correlation value C is calculated between a frame n, which is being presently displayed, and a gray image having a predetermined brightness.

Next, the control section 8 stands by for a time period calculated as the display interval Δt (step ST47). At this time, the interpolative stereoscopic image Hm continues to be displayed by the display section 7. Next, the control section changes the value of m to m+1 (step ST48), and judges whether m has become k or greater (step ST49). In the case that the result of judgment at step ST49 is negative, the process returns to step ST43, and the steps following thereafter are repeated. Thereby, the interpolative stereoscopic images Hm are displayed by the display section 7 such that the parallax progressively becomes smaller. On the other hand, if the result of judgment in step ST49 is affirmative, the process ends.

The stereoscopic image which is displayed last, the perceived depth gradually decreases, and then display is completed.

As described above, the stereoscopic image display apparatus of the first embodiment sequentially displays stereoscopic images such that the perceived depths of a frame to be displayed progressively increase. The perceived depth of the stereoscopic images can be adjusted without burdening users, and fatigue in users who stereoscopically view the stereoscopic images can be reduced.

A greater number of pairs of interpolative images are generated as the correlation value C between sequential stereoscopic images is smaller. Therefore, the perceived depths of sequentially displayed images that have different designs or subjects change more slowly. Accordingly, drastic changes in perceived depth when stereoscopic images having different designs or subjects are displayed sequentially can be prevented. As a result, fatigue in users who stereoscopically view the stereoscopic images can be reduced further.

In cases that the correlation value C is greater than or equal to a threshold value C0, the interpolative images and the interpolative stereoscopic images are not generated. Therefore, interpolative stereoscopic images are not displayed between stereoscopic images having similar designs or subjects, and they are sequentially displayed immediately. Accordingly, unnatural changes of perceived depth can be prevented, when stereoscopic images having similar designs or subjects are sequentially displayed.

The plurality of interpolative stereoscopic images are displayed such that the display intervals Δt progressively becomes shorter, when a command to switch to display of a next stereoscopic image is received. Therefore, the interpolative stereoscopic images is displayed for a long time immediately following a switch to display of a next stereoscopic image, and the display time of each following interpolative stereoscopic image gradually becomes shorter. Accordingly, drastic changes in perceived depth can be prevented, and as a result, fatigue in users who stereoscopically view the stereoscopic images can be reduced more positively.

The display interval Δt of each of the interpolative stereoscopic images is set to be longer as the correlation value C between sequential stereoscopic images is smaller. Therefore, drastic changes in perceived depth when stereoscopic images having different designs or subjects are displayed sequentially can be prevented. As a result, fatigue in users who stereoscopically view the stereoscopic images can be reduced more positively.

The interpolative stereoscopic images are sequentially displayed such that the perceived depth decreases progressively from the perceived depth of a stereoscopic image which is displayed last, when a command to cease display of the stereoscopic image is received. Therefore, fatigue caused in users due to sudden cessation of stereoscopic viewing can be prevented.

Next, a stereoscopic image display apparatus according to a second embodiment of the present invention will be described. Note that the stereoscopic image display apparatus of the second embodiment has the same construction as the stereoscopic image display apparatus 1 of the first embodiment, and only the processes performed thereby are different. Therefore, detailed descriptions of the components of the stereoscopic image display apparatus will be omitted here. The stereoscopic image display apparatus of the first embodiment displays stereoscopic images such that the perceived depth of a stereoscopic image to be displayed next gradually increases when sequentially displaying stereoscopic images. The stereoscopic image display apparatus of the second embodiment displays stereoscopic images such that the perceived depth of a previously displayed stereoscopic image gradually decreases when sequentially displaying stereoscopic images.

Figure 11:
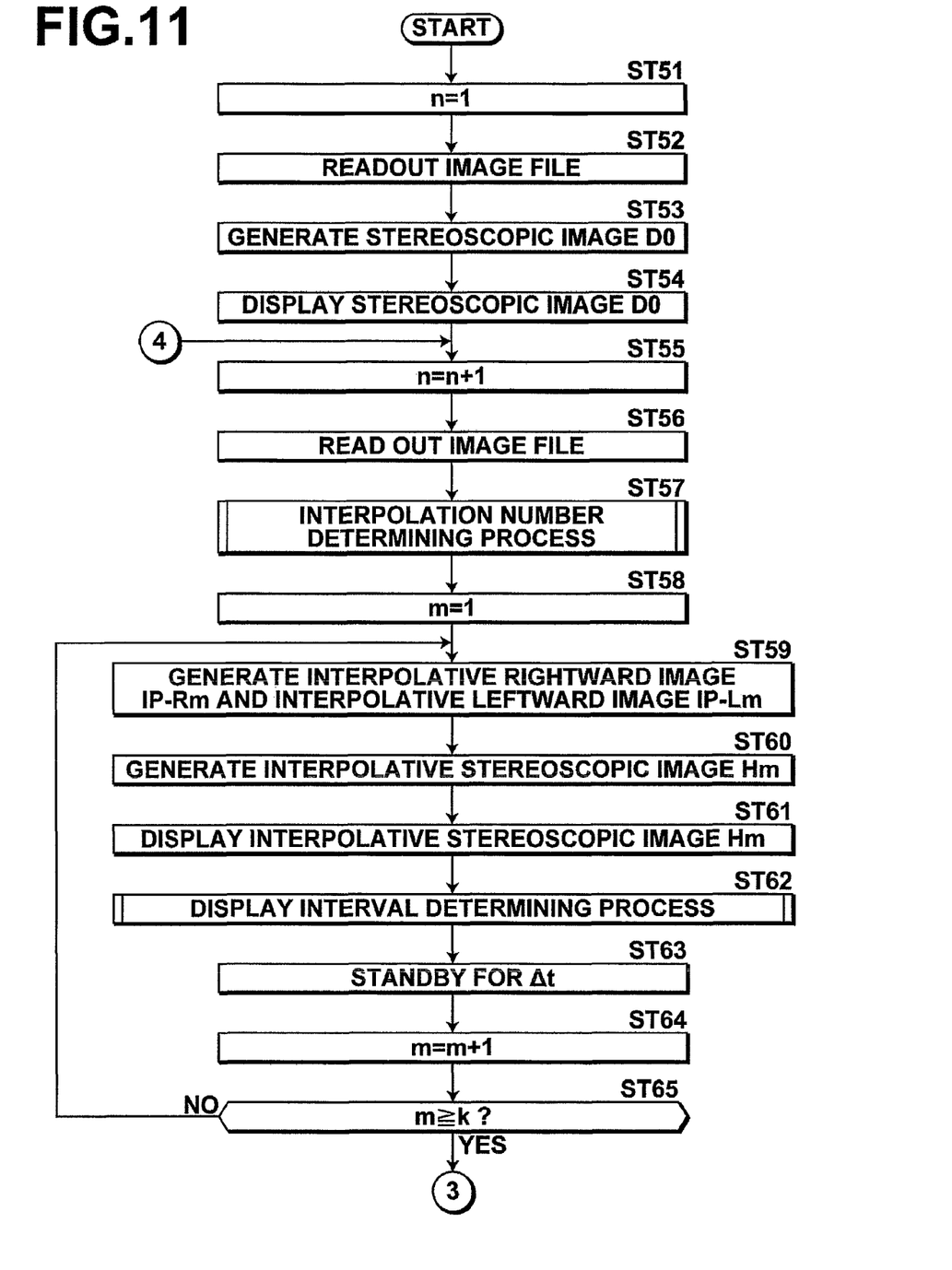
FIG. 11 is a first flow chart that illustrates the steps of a process performed by the stereoscopic image display apparatus according to a second embodiment of the present invention.
Figure 12:
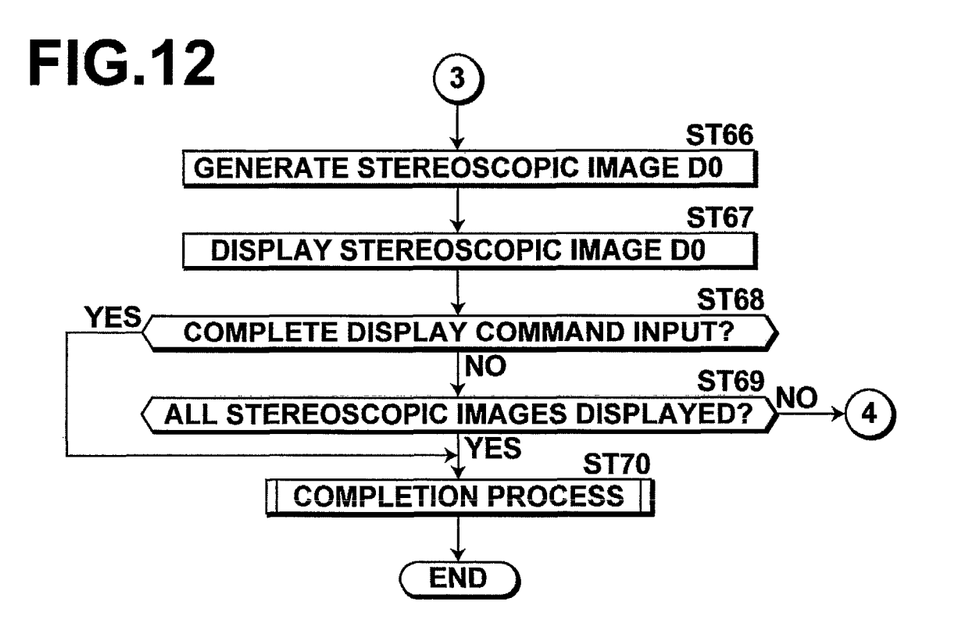
FIG. 12 is a second flow chart that illustrates the steps of a process performed by the stereoscopic image display apparatus of the second embodiment.

Next, the processes performed by the stereoscopic image display apparatus of the second embodiment will be described. FIG. 11 and FIG. 12 are flow charts that illustrate the steps of the processes performed by the stereoscopic image display apparatus of the second embodiment.

The control section 8 initiates the process by a command to display stereoscopic images being input via the input section 6. First, a frame that represents a first stereoscopic image is designated as the stereoscopic image to be displayed (step ST51, n=1). The image input section 2 reads out the image file for the frame to be displayed from the medium 2A (step ST52, READ OUT IMAGE FILE). Next, the stereoscopic image generating section 4 generates a stereoscopic image D0 from a rightward image IM-R and a leftward image IM-L which are included in the read out image file (step ST53). The control section 8 causes the display section 7 to display the stereoscopic image D0 (step ST54). Note that a predetermined value is employed as a display interval Δt at this time.

Next, the control section 8 changes the frame to be displayed to a next frame (step ST55, n=n+1), and the image input section 2 reads out the image file for the frame to be displayed from the medium 2A (step ST56, READ OUT IMAGE FILE). Then, the control section 8 performs a process to determine the number of interpolative stereoscopic images k (interpolation number k) to be generated (step ST57). Note that the interpolation number determining process is the same as that which was described with reference to FIG. 6. The correlation value C is calculated between a frame n, which is being presently displayed, and a frame n+1, for which a command to be displayed next has been input.

Next, the control section 8 sets a variable m to 1 (step ST58). Thereafter, the interpolative image generating section 3 generates interpolative rightward images IP-Rm and interpolative leftward images IP-Lm from the rightward image and the leftward image of the frame n (step ST59). The stereoscopic image generating section 4 generates interpolative stereoscopic images Hm from the interpolative rightward images IP-Rm and the interpolative leftward images IP-Lm (step ST60). The control section 8 causes the interpolative stereoscopic images Hm to be displayed by the display section 7 (step ST61). Thereafter, the control section 8 performs a process to determine display intervals $\Delta t$, during which the interpolative stereoscopic images Hm are displayed by the display section 7 (step ST62). Note that the process to determine display intervals $\Delta t$ is the same as that which was described with reference to FIG. 8. The correlation value C is calculated between a frame n, which is being presently displayed, and a frame n+1, for which a command to be displayed next has been input.

Next, the control section 8 stands by for a time period calculated as the display interval $\Delta t$ (step ST63). At this time, the interpolative stereoscopic image Hm continues to be displayed by the display section 7. Next, the control section changes the value of m to m+1 (step ST64), and judges whether m has become k or greater (step ST65). In the case that the result of judgment at step ST65 is negative, the process returns to step ST59, and the steps following thereafter are repeated. Thereby, the interpolative stereoscopic images Hm are displayed by the display section 7 such that the perceived depth progressively becomes smaller.

On the other hand, in the case that the result of judgment at step ST65 is affirmative, the stereoscopic image generating section 4 generates a stereoscopic image D0 from the rightward image IM-R and the leftward image IM-L of the next frame (step ST66). The control section 8 causes the stereoscopic image D0 to be displayed by the display section 7 (step ST67). Note that the display interval $\Delta t$ at this time is a value which is set in advance.

Next, the controls section 8 judges whether a display completion command has been input via the input section 6 (step ST68). If the result of judgment in step ST68 is negative, the control section 8 judges whether stereoscopic images have been displayed for all image files recorded in the medium 2A (step ST69). If the result of judgment in step ST69 is negative, the process returns to step ST55, and the steps following step ST55 are repeated. In the case that the result of judgment in step ST68 or step ST69 is affirmative, a completion process similar to that described in the first embodiment is performed (step ST70), and the stereoscopic image display process ends.

As described above, the stereoscopic image display apparatus of the second embodiment sequentially displays stereoscopic images such that the perceived depths of a frame which is currently being displayed progressively decrease, when a command to display a next frame is input. The perceived depth of the stereoscopic images can be adjusted without burdening users, and fatigue in users who stereoscopically view the stereoscopic images can be reduced.

Note that in the first embodiment described above, stereoscopic images for which display commands have been input are displayed such that the perceived depths thereof gradually increase, and that in the second embodiment described above, stereoscopic images are sequentially displayed such that the perceived depths of stereoscopic images which are currently being displayed gradually decrease. A combination of the processes performed by the first and second embodiments may also be performed. That is, when a command to display a next frame is input, interpolative stereoscopic images corresponding to a frame which is currently being displayed may be displayed such that the perceived depth gradually decreases, and then interpolative stereoscopic images corresponding to the next frame may be displayed such that the perceived depth gradually increases, before displaying the next frame.

In the stereoscopic image display apparatuses of the first and second embodiments described above, the interpolation number determining table LUT1 is employed to determine the interpolation number k. Alternatively, the interpolation number k may be determined by a predetermined formula. As a further alternative, a predetermined interpolation number k may be employed, without performing the interpolation number determining process.

In the stereoscopic image display apparatuses of the first and second embodiments described above, the display interval determining tables LUT2, LUT3, and LUT4 are employed to determine the display intervals $\Delta t$. Alternatively, the display intervals $\Delta t$ may be determined by a predetermined formula. As a further alternative, predetermined display intervals $\Delta t$ may be employed, without performing the display interval determining process.

In the stereoscopic image display apparatuses of the first and second embodiments described above, three display interval determining tables LUT2, LUT3, and LUT4 are employed, corresponding to the ranking of correlation values C. Alternatively, a single table may be employed regardless of the magnitude of the correlation value C.

In the stereoscopic image display apparatuses of the first and second embodiments described above, the interpolative rightward images and the interpolative leftward images are generated each time that a frame switching command is input to switch display to a next stereoscopic image. Alternatively, interpolative rightward images, interpolative leftward images, and interpolative stereoscopic images may be generated in advance for sequential frames, and stored in the frame buffer 5. In this case, the time required to generate the interpolative stereoscopic images when switching among frames can be shortened.

Embodiments of the stereoscopic image display apparatus 1 have been described above. Programs that cause computers to function as the interpolative image generating section 3, the stereoscopic image generating section 4 and the control section 8 described above, to perform the processes illustrated in FIGS. 4, 5, 6, 8, and 10 through 12 are also embodiments of the present invention. In addition, computer readable media having such programs recorded therein are also embodiments of the present invention.

What is claimed is:

1. A stereoscopic image display apparatus for sequentially displaying a plurality of stereoscopic images generated from a plurality of images obtained by photography of subjects from different viewpoints, comprising:

an interpolative image generating unit, for generating at least one pair of interpolative images, which have smaller degrees of parallax than the degree of parallax among the plurality of images;

a stereoscopic image generating unit, for generating at least one interpolative stereoscopic image from the at least one pair of interpolative images; and a display control unit, for sequentially displaying the at least one interpolative stereoscopic image at at least one of a timing prior to and following display of the stereoscopic images;

the interpolative image generating unit being a unit that generates a greater number of pairs of interpolative images as a correlation between sequential stereoscopic images is smaller; and the display control unit being a unit that displays interpolative stereoscopic images with respect to a previously displayed stereoscopic image such that perceived depth progressively decreases after display of the previously displayed stereoscopic image, when a display command to display a stereoscopic image is received.

2. A stereoscopic image display apparatus as defined in Claim 1, wherein:

the display control unit sequentially displays the at least one interpolative stereoscopic image such that perceived depth in the sequence of at least one interpolative stereoscopic image increases progressively up to a perceived depth of a stereoscopic image, when a command to display the stereoscopic image is received.

3. A stereoscopic image display apparatus as defined in Claim 1, wherein:

in the case that a plurality of stereoscopic images are displayed, the interpolative image generating unit ceases generation of the interpolative images if the correlation between sequential stereoscopic images is greater than or equal to a predetermined threshold value; and the display control unit ceases display of the interpolative stereoscopic images at least one of a timing prior to and following display of the stereoscopic images, for which generation of the interpolative images has been ceased.

4. A stereoscopic image display apparatus as defined in Claim 1, wherein:

in the case that a plurality of stereoscopic images are displayed, the interpolative image generating unit generates a plurality of pairs of the interpolative images;

the stereoscopic image generating unit generates a plurality of the interpolative stereoscopic images; and the display control unit sequentially displays the plurality of interpolative stereoscopic images such that the display time progressively becomes shorter, when a command to switch to display of a next stereoscopic image is received.

5. A stereoscopic image display apparatus as defined in Claim 4, wherein:

the display control unit sets the display time of each of the interpolative stereoscopic images to be longer as the correlation between sequential stereoscopic images is smaller.

6. A stereoscopic image display apparatus as defined in Claim 1, wherein:

the display control unit sequentially displays the interpolative stereoscopic images such that the perceived depth decreases progressively from the perceived depth of a stereoscopic image, when a command to cease display of the stereoscopic image is received.

7. A stereoscopic image display method for sequentially displaying a plurality of stereoscopic images generated from a plurality of images obtained by photography of subjects from different viewpoints, comprising:

generating at least one pair of interpolative images, which have smaller degrees of parallax than the degree of parallax among the plurality of images;

generating at least one interpolative stereoscopic image from the at least one pair of interpolative images such that a greater number of pairs of interpolative images is generated as a correlation between sequential stereoscopic images is smaller; and sequentially displaying the at least one interpolative stereoscopic image at at least one of a timing prior to and following display of the stereoscopic images such that interpolative stereoscopic images with respect to a previously displayed stereoscopic image are displayed such that perceived depth progressively decreases after display of the previously displayed stereoscopic image, when a display command to display a stereoscopic image is received.

8. A non-transitory, computer readable medium having stored thereon a program that when executed by a computer causes the computer to execute a stereoscopic image display method for displaying stereoscopic images generated from a plurality of images obtained by photography of subjects from different viewpoints, the method comprising:

generating at least one pair of interpolative images, which have smaller degrees of parallax than the degree of parallax among the plurality of images such that a greater number of pairs of interpolative images is generated as a correlation between sequential stereoscopic images is smaller;

generating at least one interpolative stereoscopic image from the at least one pair of interpolative images; and sequentially displaying the at least one interpolative stereoscopic image at at least one of a timing prior to and following display of the stereoscopic images such that interpolative stereoscopic images with respect to a previously displayed stereoscopic image are displayed such that perceived depth progressively decreases after display of the previously displayed stereoscopic image, when a display command to display a stereoscopic image is received.

* * * * *